US005516394A

United States Patent [19]

Rimai et al.

[11] Patent Number: 5,516,394

[45] Date of Patent: May 14, 1996

[54] TONER FIXING METHOD AND RECEIVING SHEET

[75] Inventors: Donald S. Rimai, Webster; Muhammad Aslam, Rochester, both of N.Y.

[73] Assignee: Eastman Kodak Company, Rochester, N.Y.

[21] Appl. No.: 810,008

[22] Filed: Dec. 18, 1991

Related U.S. Application Data

[62] Division of Ser. No. 405,258, Sep. 11, 1989, Pat. No. 5,089,363.

[51] Int. Cl.[6] .......... B32B 31/00

[52] U.S. Cl. .......... 156/238; 430/11; 430/13; 430/120; 430/126; 430/18; 430/107; 427/146

[58] Field of Search .......... 430/120, 126, 430/11, 13, 18, 107; 427/146; 156/238

[56] References Cited

U.S. PATENT DOCUMENTS

| | | | |
|---|---|---|---|
| 3,591,276 | 7/1971 | Byrne | 355/3 |
| 3,685,896 | 8/1972 | Kaupp | 355/3 |
| 3,851,964 | 12/1974 | Smith et al. | 355/10 |
| 3,893,761 | 7/1975 | Beuchan et al. | 355/3 R |
| 4,337,303 | 6/1982 | Sahyuna et al. | 430/11 |
| 4,455,079 | 6/1984 | Miwa et al. | 355/3 TR |
| 4,518,976 | 5/1985 | Tarumi et al. | 346/153.1 |
| 4,529,650 | 7/1985 | Martinez | 428/336 |
| 4,531,825 | 7/1985 | Miwa et al. | 355/3 TR |
| 4,639,405 | 1/1987 | Franke | 430/124 |
| 4,780,742 | 10/1988 | Takahashi et al. | 355/3 FU |
| 4,927,727 | 5/1990 | Remai et al. | 430/99 |
| 4,968,578 | 11/1990 | Leight et al. | 430/126 |

FOREIGN PATENT DOCUMENTS

| | | | |
|---|---|---|---|
| 0295901 | 6/1988 | European Pat. Off. | G03G 15/20 |
| 0301585 | 7/1988 | European Pat. Off. | G03G 8/00 |
| 0354530 | 8/1989 | European Pat. Off. | G03G 13/16 |
| 0363686 | 9/1989 | European Pat. Off. | G03G 15/20 |
| 48-9963 | 3/1973 | Japan . | |
| 52-07435 | 4/1977 | Japan . | |
| 58-17664 | 10/1983 | Japan . | |
| 58-220893 | 12/1983 | Japan . | |
| 60-18816 | 1/1985 | Japan . | |
| 63-92965 | 4/1988 | Japan | G03G 15/01 |

OTHER PUBLICATIONS

*Chemical Engineers' Handbook*, 5th ed., McGraw–Hill, 1973, Table 23–10, pp. 23–63.

International Search Report for PCT–405,258.

*Primary Examiner*—Chester T. Barry

*Attorney, Agent, or Firm*—Leonard W. Treash, Jr.

[57] ABSTRACT

A dry toner image is fixed to a thermoplastic layer on a receiving sheet by pressing a ferrotyping web against the image in the presence of sufficient heat to soften the layer. A curl preventing layer opposite the thermoplastic layer does not offset on a backing roller or the like because it has a melting point that is high compared to the thermoplastic layer.

5 Claims, 4 Drawing Sheets

TONER FIXING METHOD AND RECEIVING SHEET

CROSS REFERENCE TO RELATED APPLICATIONS

This application is a division of U.S. Ser. No. 405,258, filed Sep. 11, 1989, now U.S. Pat. No. 5,089,363, Aslam et al, issued Feb. 18, 1992.

This application is related to co-assigned U.S. Pat. No. 5,023,038, issued Jun. 11, 1991, METHOD AND APPARATUS FOR TEXTURIZING TONER IMAGE BEARING RECEIVING SHEETS AND PRODUCT PRODUCED THEREBY, Muhammad Aslam et al.

TECHNICAL FIELD

This invention relates to fixing and transferring of toner images, and more specifically to a method for treating a toner image, especially a multicolor toner image made up of extremely fine toner particles, to transfer or fix the image to a thermoplastic outer layer of a receiving sheet. It also relates to a receiving sheet for such a method.

BACKGROUND ART

Most prior attempts to create color images of photographic quality using the science of electrophotography have employed liquid developers. For many years it was thought that liquid developers were the only developers with fine enough particles to give the resolution ordinarily experienced with silver halide photography. Recently, multicolor images have been formed using toner particles finer than 8 microns in diameter and in some instances finer than 3.5 microns in diameter. With such size particles granularity comparable to silver halide photography is obtainable.

Finishing color images with such fine particles while maintaining resolution has posed many problems. Ordinary heated roller, pressure fusing has a tendency to spread the particles on the surface of a receiving sheet, destroying the fine granularity created by the fine particles. Infrared heating also causes some spread of the particles as the particles are encouraged to flow in order to become fixed.

Of more concern, the particles are formed on the surface of the receiving sheet in a series of layers, the height of which is dependent upon the density and the particular combination of colors needed to make up the image. This creates a substantial relief image which is quite noticeable to the eye. This is especially the case after infrared fusing, but also is apparent after hot pressure roller fusing of the type used in most copiers. This relief image is sufficiently unacceptable that a multicolor print made with it would not be competitive with a comparable silver halide product.

In most photographic work a glossy appearance is desirable and provides an appearance of image sharpness. However, with prior copying fusing systems gloss levels in excess of 20 were rare. Further, the sane variation in amount of toner which causes relief also causes a variation in image gloss.

U.S. Pat. No. 4,337,303, Sahyun et al, issued Jun. 29, 1982, discloses a relatively low speed method of transferring fine toner particles from a photoconductor to a receiving sheet having a thermoplastic coating on it. According to that patent the thermoplastic coating is heated to its softening point, preferably a temperature between 20° and 70° C. Under moderate pressure the toner is "encapsulated" in the thermoplastic layer, with less than 25% of the particles protruding.

Japanese Kokai 63-92965 (1988), laid-open Apr. 23, 1988, discloses a method of treating a color image on a thermoplastic layer on a receiving sheet by passing the sheet between a pair of rollers, with at least the roller contacting the image being heated in the presence of a pressure of 4 kg/cm$^2$. Both rollers are formed of silicone rubbers. It is suggested that, if the thermoplastic is heated higher than its softening point but lower than the softening point of the toner, the toner can be pushed into the thermoplastic. This procedure, it is suggested, will remove the unevenness of the surface of the electrophotographic image. Thermoplastically coated receiving sheets of this type have a tendency to blister when subject to heat and pressure due to moisture in a paper support turning to steam and being trapped by the thermoplastic.

U.S. Pat. No. 4,780,742 shows a method and apparatus for treating a fixed color toner image carried on a transparency sheet. The sheet is passed between a thin plastic sheet and a pair of rollers in the presence of heat which presses the thin sheet around the toner to soften, fuse and add gloss to the image. The thin sheet is peeled off after the image has cooled. According to the patent, this provides an image that scatters light less in projection.

European patent application 0 301 585 published Feb. 1, 1989, shows a glazing sheet used to increase the gloss of either a toner image on a paper support or a dye and developer in a thermoplastic coating. The glazing sheet is pressed against the paper sheets with moderate pressure and the dye-thermoplastic sheets with substantial pressure. Resolution, relief and variable glossing are not mentioned as problems.

In the latter two references the image and sheet are allowed to cool before separation. This approach to preventing release in pressure fixing devices is shown in a large number of references; see, for example, European patent application 0 295 901 and U.S. Pat. No. 3,948,215.

For a variety of reasons, none of the above approaches are totally successful in fixing fine particle toner images at reasonably useful speeds without loss of resolution and with elimination of relief and without other attendant problems, such as, blistering, variable gloss and the like.

DESCRIPTION OF INVENTION

It is an object of the invention to provide a method and apparatus for reducing the tendency toward relief of toner images while maintaining fine resolution. It is an object of the preferred embodiment of the invention to so improve high quality multicolor toner images of very fine toner particles.

This and other objects are accomplished by a method which begins with a receiving sheet having a thermoplastic outer layer upon which is supported a toner image. The sheet is preheated until the thermoplastic outer layer reaches or approaches its glass transition temperature. The image-bearing surface is placed in contact with a heated ferrotyping material which raises the temperature above or maintains it above its glass transition temperature. A force is applied urging the ferrotyping material toward the thermoplastic layer with sufficient pressure to embed the toner image in the heated layer and substantially reduced visible relief in the image. The layer is allowed to cool below its glass transition temperature while still in contact with the ferrotyping material. After having cooled, the layer is separated from the ferrotyping material.

Preheating of the thermoplastic layer reduces the demands on heat transfer in the ferrotyping step and therefore the temperature of the ferrotyping surface which in turn reduces blistering of the receiving sheet and defects associated with inconsistent heating. It also permits high pressure, which is difficult to attain when substantial heat transfer is required in the nip and permits high process speeds.

According to a preferred embodiment, the ferrotyping material is in the form of a web or belt, which ferrotyping web and receiving sheet are pressed together by a pair of pressure rollers, at least one of which is heated, to provide a substantial pressure in the nip, for example, a pressure of at least 100 pounds per square inch. Best results with multilayer color toner images are achieved with a pressure of 300 pounds per square inch or more. In fact advantages in some applications were realized at pressures of in excess of 1000 pounds per square inch.

According to another preferred embodiment of the invention, the process is carried out with a receiving sheet which in addition to the softenable thermoplastic layer on one surface has a curl reducing material on the other surface. The curl reducing material is similar to the softenable layer in effect on curl of the sheet from ambient changes in temperature and moisture, but has a higher resistance to softening or melting than the thermoplastic layer. It therefor is easier to handle when in and leaving a hot pressure nip. This receiving sheet is advantageous in other applications in which the thermoplastic is softened by heat while the back of the sheet is in contact with another member to which it could stick. For example, it is useful in a thermally assisted transfer process.

According to another preferred embodiment of the invention, an apparatus is provided which includes a pair of pressure rollers forming a nip, means for heating the receiving sheet until the thermoplastic layer reaches at least its glass transition temperature, a ferrotyping web supported in part by one of the rollers and movable through a path including the nip, the web having a surface facing the other of said rollers in the nip which surface is hard, smooth and of low surface energy, means for feeding the heated receiving sheet into the nip with the image-bearing thermoplastic layer facing the surface of the web and means for applying sufficient pressure to said rollers to entirely embed the toner image in the heated thermoplastic layer. The web has a path permitting said web and receiving sheet to maintain contact until the thermoplastic layer is cooled below its glass transition temperature.

Because fusing oil normally applied with a pressure fuser cannot be used in this high quality of application, one would ordinarily expect such high pressures with softened thermoplastic and somewhat softened toner to provide toner offset. However, this appears to be eliminated by the scheme (known, per se), of allowing the material to cool while in contact with the ferrotyping web before separation. Thus, high quality multicolor images were obtained with granularity comparable with that of the loose toner image and with a remarkable elimination of relief. This was accomplished in the absence of fusing oil, which would have ordinarily ruined such an image.

It also left a high gloss on the image desirable in many photofinishing applications.

BRIEF DESCRIPTION OF THE DRAWINGS

In the detailed description of the preferred embodiment of the invention presented below reference is made to the accompanying drawings, in which.

THE BEST MODE OF CARRYING OUT THE INVENTION

Figure 1:
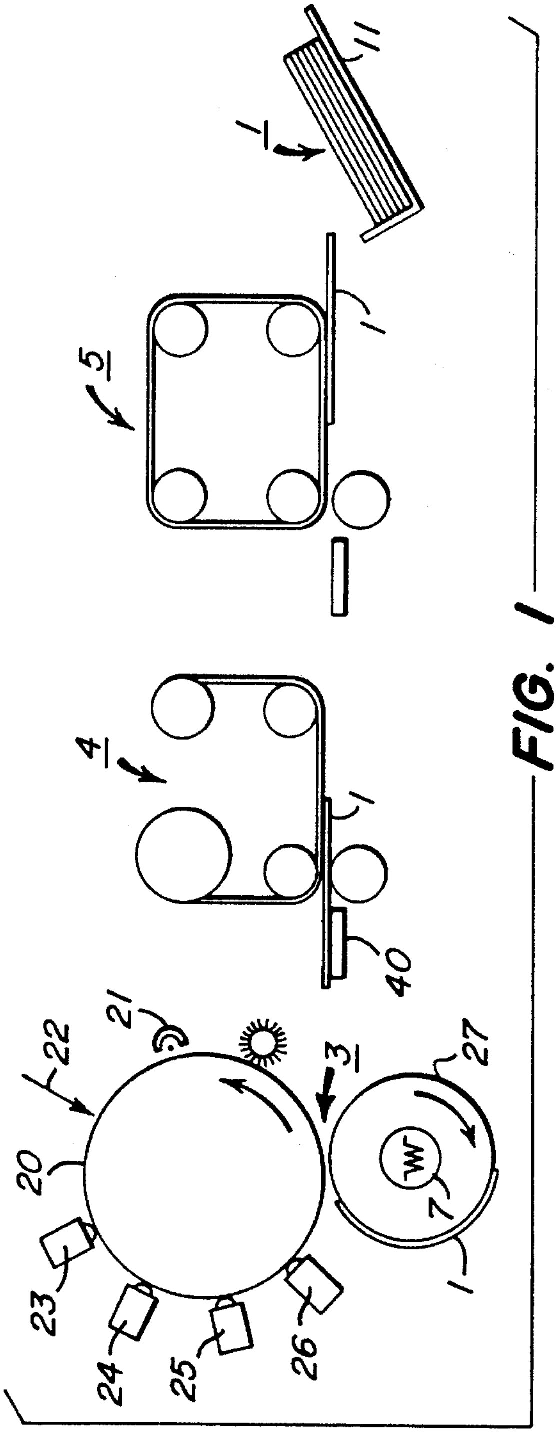
FIG. 1 is a side schematic view of an apparatus for producing finished multicolor toner images.

According to FIG. 1 a receiving sheet 1 is fed along a path through a series of stations. The receiving sheet 1 is shown in section in FIG. 2 and has a paper support 10 with a readily softenable thermoplastic layer 9 coated on its top side. Preferably, the paper support 10 also has a curl preventing coating 8 on its bottom side. These materials will be explained in more detail below.

Receiving sheet 1 is fed through a path past an image transfer station 3, a fixing station 4, texturizing station 5 and into a receiving hopper 11.

A multicolor toner image can be formed by a number of means on receiving sheet 1. For example, according to FIG. 1, a photoconductive drum 20 is uniformly charged at a charging station 21 exposed by a laser, an LED or an optical exposure device at exposure station 22 and toned by different color toning stations 23, 24, 25 and 26. Consistent with conventional color electrophotography, consecutive images are toned with different colors by toning stations 23–26. The consecutive images are then transferred in registry to the surface of receiving sheet 1 at transfer station 3 where sheet 1 is secured to transfer roller 27 and repetitively brought into transfer relation with the images to form a multicolor toner image thereon. Single color images can also be formed by the same apparatus.

Extremely high quality electrophotographic color work with dry toner particles requires extremely fine toner particles. For example, images comparable to photographic color prints have been produced with toner particles having an average diameter less than 8 mM, and especially less than 3.5 mM. Because of difficulties encountered in electrostatically transferring such small toner particles, transfer station 3 is preferably of the thermally assisted type, in which transfer is accomplished by heating both the toner and the thermoplastic layer of the receiving sheet causing preferential adherence between the toner and receiving sheet as compared to the toner and whatever surface is carrying it, in this instance photoconductive drum 20. For this purpose transfer roller 27 is heated by a lamp 7 which heats the thermoplastic layer 9 to its glass transition temperature which assists in the transfer of the toner to layer 9 by partially embedding the toner in layer 9.

A multicolor image can also be formed using an intermediate drum or web to which two or more color toners are transferred in registry and then transferred as a single multicolor image to a receiving sheet. Sheet 1 can also receive a multicolor image directly from drum 20 in a single transfer if that image is formed on photoconductive drum 20 by a known process which exposes and develops second, third and fourth color images on top of previously formed color images. In summary, any of a number of known techniques may be used to provide a multicolor image of dry, extremely fine toner particles on or slightly embedded in the upper thermoplastic surface of receiving sheet 1.

Figure 2:
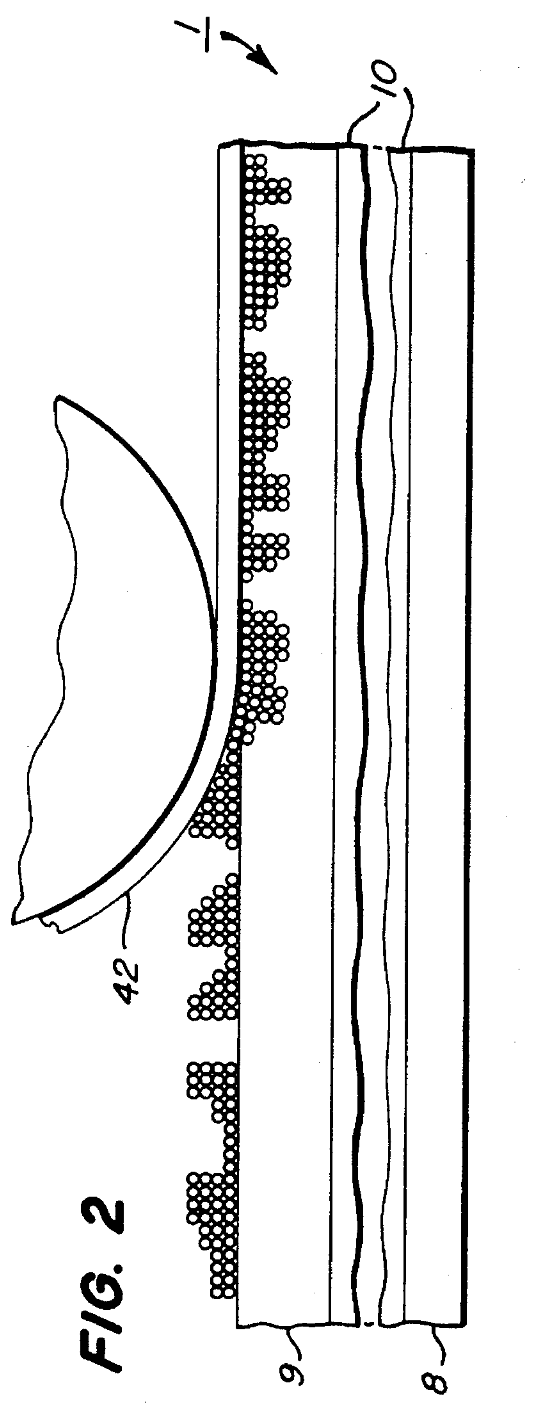
FIG. 2 is a side section greatly magnified illustrating the fixing of multicolored toner images as carried out by the apparatus of FIG. 1.

Referring to FIG. 2, these finely divided toner particles (exaggerated in size in FIG. 2) have a tendency to extend in layers a substantial and varying height above the surface of receiving sheet 1. Ordinary pressure roller fusing has a tendency to flatten somewhat the layers of toner, but also spreads such layers, increasing substantially the granularity of the image and noticeably impairing its quality. Further, the fine toner has a tendency to offset on the pressure fuser unless fusing oils are used. Such fusing oils, while acceptable for ordinary copying work, leave blotches on the sheet surface that are unacceptable for photographic quality imaging. Pressure roller fusers using one hard roller and one more resilient roller to create a substantial nip for acceptable heat transfer also leave a noticeable relief image in the print, which for photographic quality is an unacceptable defect. With receiving sheets that are coated on both sides, blistering with such fusers is a significant problem.

Prior infrared heaters do not have the tendency to spread the toner layers to the extent that pressure roller fusers do, but do not in any way contribute to the reduction of relief. Such fusers rely totally on melting of the image which, in itself, causes some flow and also coalescence and some loss of resolution. Such heaters are inefficient, create fire hazards and require radiation shielding.

Figure 3:
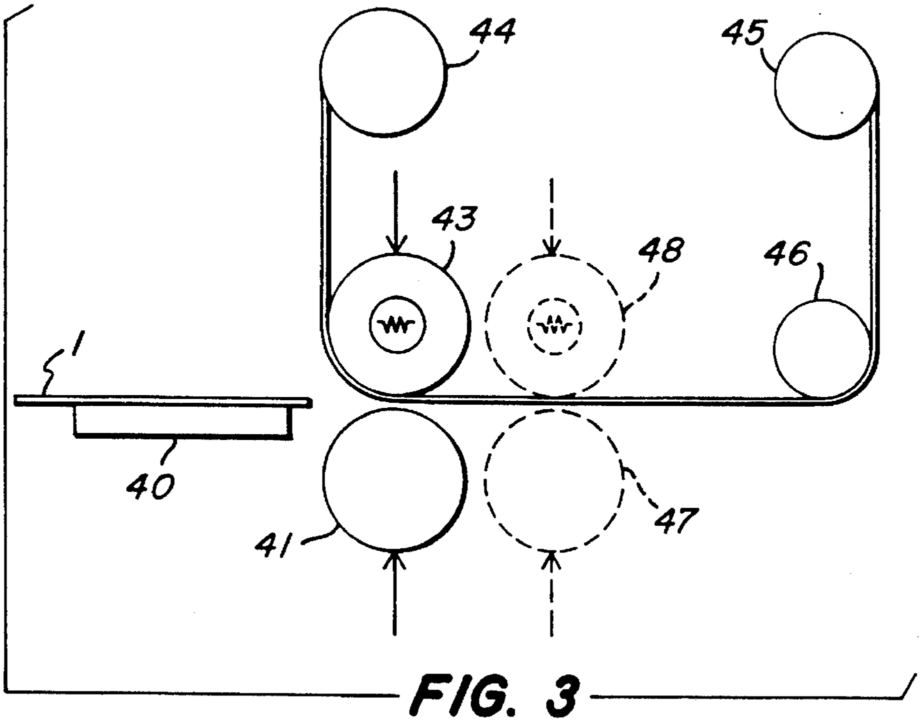
FIG. 3 is a side section of a fixing apparatus incorporated in the apparatus of FIG. 1.

Fixing station 4 is best shown in FIG. 3, where receiving sheet 1 is heated by preheating device 40 sufficiently to soften or to approach softening thermoplastic layer 9 on paper support 10. Preheating device 40 is shown as an ordinary conduction heating device which heats thermoplastic layer 9 through paper support 10. Other known heating devices could be used, for example, an infrared heating device on the upper side of receiving sheet 1 which directly heats layer 9. Receiving sheet 1 with thermoplastic layer 9 heated to or nearly to its softening point, now passes between a backing roller 41 and a ferrotyping web 42 pressed against receiving sheet 1 by a roller 43 which is also heated to prevent the cooling of thermoplastic layer 9 below its softening point or to finish raising the temperature of the thermoplastic to or above its glass transition temperature. Rollers 41 and 43 are urged together with substantial force to create substantial pressure between ferrotyping web 42 and toner image and layer 9.

With layer 9 softened by heat, the toner is pushed into it, totally embedding itself in layer 9. This action is shown best in FIG. 2, where the toner image is first shown, at the left, to have substantial relief characteristics as it is piled in layers on top of now softened layer 9. Although the toner image is shown as entirely on top of layer 9, if thermal assisted transfer was used at transfer station 3, some of the toner may be already partially embedded in layer 9. However, at the present state of the art, that transfer step with most materials is not capable of completely fixing the toner image. Accordingly, as shown in FIG. 2, ferrotyping web 42 pushes all of the layers of toner into thermoplastic layer 9 allowing the thermoplastic to flow over the toner thereby fixing the image. It has been found that with substantial pressures and appropriate temperatures this method of embedding toner in the layer 9 provides an image which is well fixed, has high gloss, and is free of noticeable relief. Because the toner is fixed by being pushed into the layer 9, it does not spread and does not destroy the sharpness or noticeably increase the granularity provided by the fine toner particles.

In conventional fusing systems one (or both) roller is somewhat compliant to create a wide nip to allow sufficient heating area. Unfortunately, the wide nip prevents obtaining sufficiently high pressure to remove the relief in these materials. Such conventional fusing systems typically provide gloss levels less than 20. Also, when using coated papers, the wide nip causes overheating, and thereby contributes to blisters as the receiving sheet leaves the nip.

Similarly, conventional fusing systems use a fusing oil to prevent adhesion of the image to the roller contacting it. With a thermoplastic layer on the receiving sheet, such adhesion is even more likely. Unfortunately, the use of oil adversely affects image quality and leaves an oily coating on the receiver which is unacceptable in photographic grade reproduction.

According to FIG. 3 the ferrotyping web 42 contacts the image and the thermoplastic coating over a substantial distance. The ferrotyping web 42 is a smooth, hard web having low surface energy. It can be in the form of an endless belt (FIG. 4) or a spooled web (FIG. 3). Preferably, it should have a surface energy less than 47 ergs/$cm^2$, preferably less than 40 ergs/$cm^2$ and a Youngs modulus of $10^8$ Newtons/$m^2$ or greater. The FIG. 3 embodiment shows web 42 mounted around a series of rollers, including roller 43, a supply roller 44, a takeup roller 45 and a separating roller 46. Web 42 is driven at the same speed as receiving sheet 1, either by driving one of the rollers, for example, takeup roller 45, or by allowing receiver 1 to drive web 42 through friction. Preferably, web 42 is driven by roller 43 which is part of the pair of rollers 41 and 43 which applies the primary pressure to the system. A tensioning drive (not shown) is applied to takeup roller 45 to maintain proper tensions in the system. Rollers 41 and 43 apply substantial pressure to the interface between ferrotyping web 42 and receiver 1.

Rollers 41 and 43 are preferably hard metallic rollers to maintain pressures in the nip not ordinarily obtainable using compliant rollers. For good results the pressure should be 100 pounds per square inch or greater. Above 100 psi further improvement is seen with greater pressure. For example, sufficient force can be placed between rollers 43 and 41 if both have a hard metallic surface to create a pressure in the nip between web 42 and sheet 1 in excess of 300 pounds per square inch. Excellent results have been obtained at pressures in excess of 1,000 pounds per square inch.

Preheating device 40 is used to soften the thermoplastic layer 9 on the receiving sheet 1. One or both of rollers 41 and 43 is also heated to raise or maintain the temperature of the thermoplastic layer above its glass transition temperature which permits forcing the toner into the thermoplastic layer. Preferably, roller 43 is hard and is heated, and web 42 wraps a portion of roller 43 to allow roller 43 to preheat web 42. Preferably, roller 41 is unheated, which lessens the probability of a thermoplastic backing 8 adhering to roller 41, a problem discussed below.

After receiving sheet 1 has passed through the area of heaviest pressure and heat between rollers 41 and 43, both it and ferrotyping web 42 begin to cool. As the thermoplastic layer on receiving sheet 1 cools below its glass transition temperature, the toner becomes fixed in the thermoplastic layer and loses its tendency and the tendency of the thermoplastic layer to release with web 42. Therefore, when web 42 is separated from receiving sheet 1 at separating roller 46, the image and thermoplastic layer 9 are not retained by it. The resulting image is well fixed, has high resolution and has a high gloss. The toner has become entirely embedded in the thermoplastic and the thermoplastic has formed over it. The thermoplastic prevents light scattering by the toner particles and provides the high gloss, from ferrotyping web 42, while the toner does not flow or spread and maintains its integrity providing substantially its original low granularity.

An additional set of rollers 47 and 48, identical to rollers 41 and 43, can be used to further apply gloss and fixing to the image.

In some high quality applications, adding an extra heating source between rollers 48 and 46 gives the thermoplastic an opportunity to relax while heated. Although it still must cool before separation, this approach reduces a phenomena known as "deglossing".

If a finish other than high gloss is desired on the image, a texturizing surface can be formed on the ferrotyping material 42 to impart lower gloss finishes such as satin, silk screen, or the like. Approaches to texturizing are discussed more thoroughly below.

Ferrotyping web 42 can be made of a number of materials. Both metals and plastics have been successfully used. For example, a highly polished stainless steel belt, an electroformed nickel belt, and a chrome plated brass belt both have both good ferrotyping and good release characteristics. However, better results have been obtained with conventional polymeric support materials such as polyester, cellulose acetate and polypropylene webs. Materials marketed under the trademarks Estar, Mylar and Kapton F give gloss levels extending into the 90's.

Metal belts coated with heat resistant low surface energy polymers have also been found to be effective in this process. For example, a number of unfilled, highly crosslinked polysiloxanes are coated on a metal support, for example, stainless steel. The metal support provides the hardness required while the coating contributes to the low surface energy. The metal also provides durability. Experiments were carried out with five commercially available, heat curing, hard silicone resins supplied as 50%. solid in xylene or xylene/toluene mixed solvents. The stainless steel belt alone provided a gloss level of 37. With the resin coatings, gloss levels varied from 57 to 95 with very few image defects. As mentioned above, the same images with conventional roller fusers provide gloss levels well under 20 and require silicone oils which create serious image defects.

The thickness of the ferrotyping web is not critical, but it should be thin enough to allow heat transfer but thick enough for durability. A polypropylene film support utilized for this purpose would comply with these requirements by being between 1 and 4 mils thick. It is important that the ferrotyping material have a surface energy that is low enough to provide appropriate separation at separation roller 46. For this purpose a surface energy of less than 47 ergs per centimeter$^2$ is preferred and especially preferred is a surface energy of less than 40 ergs/cm$^2$. Many low surface energy materials are too soft to be sufficiently smooth to impart a glossy finish; therefore, materials should be sufficiently hard to impart the desired finish. Preferably, the web should have a Young's modulus of 108 Newtons/m$^2$ or greater.

Although we have found acceptable results by merely allowing the materials to cool prior to separation under ambient conditions, high speed cooling can be assisted by special cooling devices, such as blowers and the like (not shown).

As mentioned above, best results are obtained with both rollers 41 and 43 as hard rollers thereby providing the greatest pressure, i.e., 300 psi or greater. However, good results have been obtained in less demanding applications (such as black and white and less demanding color reproduction) with roller 41 or roller 43 or both slightly compliant with a very thin coating of elastomeric material on an aluminum base which will provide a slight width to the nip. Depending on the thickness of the coating or coatings, pressures in the lower portion of the acceptable range can be obtained in this manner, for example, between 100 and 300 psi.

The thermoplastic coating 9 is heated above its glass transition temperature by the preheating device 40 and the rollers, preferably roller 43 and ferrotyping web 42. With a thermoplastic layer 9 having a glass transition temperature between 45° and 70° C., we have obtained good results raising its temperature to approximately its glass transition temperature by preheating alone. It is preferable, although not necessary, that the toner have a glass transition temperature above that of the thermoplastic, for example, between 55° and 70° C. If the ferrotyping web is maintained at 105° C. as it approaches the nip, some of the toner will soften. But at any of these temperatures, layer 9 is more soft and the toner embeds without spreading. If separation occurs only after the thermoplastic is again below the glass transition temperature, exact control over the temperature in the nip is not critical.

The preheating step reduces the need for substantial temperature transfer by the ferrotyping material. Because heat transfer is difficult with a narrow nip, this allows the use of hard rollers 41 and 43 which facilitates application of greater pressure and makes substantial fixing speeds possible.

Further, we have found that the tendency of the thermoplastic layer to degloss is less if a substantial preheating step is used. This is believed to be due to greater stabilization of the thermoplastic when hot due to a preheating step that by its nature is more gradual.

Of perhaps more importance than these considerations is a substantial lessening of the tendency of the receiving sheet to blister if preheated. Blistering is caused by moisture in the paper turning to steam and trying to escape. It can escape ordinary paper without problem. However, the coatings 8 and 9 are more restrictive to its passage and will have a tendency to blister in the nip between ferrotyping web 42 and roller 41. These layers will pass moisture at a slow rate. The more gradual heating at preheating device 40 permits much of the moisture to escape without blistering prior to the nip and lessens the blistering effect of an abrupt rise in temperature in the nip.

It is well known in the photographic and printing arts to coat opposite sides of image bearing sheets with similar materials to prevent those materials from curling. Thus, while uncoated paper would not curl, once thermoplastic layer 9 is added, the difference in the reaction to heat and humidity of paper and the thermoplastic will tend to cause the paper to curl in changing conditions. For this reason, layer 8 is added to the opposite side which offsets the curl producing tendency of layer 9 and also keeps moisture in the paper, making it more like most environments.

In the photographic art, layer 8 would ordinarily be of the exact same material and thickness as layer 9. However, we have found that curl can be prevented by using a similar material to that of layer 9, but with some properties advantageously different. More specifically, in the process shown in FIG. 1 a material having similar curl characteristics to layer 9 can be applied as layer 8 but with a significantly higher melting point. For example, a polyethylene or polypropylene layer 8 having softening and melting points 115° C. or greater and of proper thickness will substantially counter the curl tendency of a thermoplastic coating 9 having a glass transition temperature between 45° and 70° C. and of a particular thickness. With such a structure, offset of layer 8 onto roller 41 (and roller 47), preheating device 40 and, perhaps most important, transfer roller 27 is prevented. If layer 8 were of the same material as layer 9, it would be necessary to either provide a liquid release agent to roller 41 (and transfer roller 27 and preheating device 40) or provide an endless web similar to web 42 for contact with layer 8. To exactly counter the tendency of layer 9 to curl the paper in one direction, the density of layer 8 can be adjusted. Such precision does not appear to be necessary.

For example, high grade photographic paper stock coated with a 1.0 mil polyethylene coating on its back side was coated on the other side with a 0.5 mil coating of a polystyrene thermoplastic, marketed by Goodyear under the tradename Pliotone 2015 which has a glass transition temperature between 50° and 60° C. The polyethylene has melting and glass transition temperatures above 115° C. A multicolor toner image of toners having a glass transition temperature between 55° and 65° C. was formed on the thermoplastic layer. The sheet was heated to between 55° and 60° C. by preheating device 40 and fed at a rate of 35 mm./sec between a ferrotyping web 42 of 3 mil polypropylene having a melting point in excess of 200° C. Web 42 was backed by a metal roller 43 heated to a temperature of 105° C. The receiving sheet was backed by an unheated metal roller 41. A pressure of approximately 300 psi was applied. High quality prints were obtained with very low granularity using toners of average diameter of approximately 3.5 microns. Neither surface of the receiving sheet had a tendency to offset onto web 42 or roller 41. The sheets did not have a tendency to curl when subjected to normal temperature and humidity changes. With a preheating device long enough to allow contact with receiving sheet 1 of at least one second, good results at faster times (in excess of 200 mm./sec) were also achieved. Without preheating device 40, it was difficult to get good results above 10 min./sec.

With most materials, when the receiver 1 leaves web 42 at roller 46 it has a permanent high gloss above or approaching 90. However, with some materials, the gloss and its permanence can be improved by a second treatment similar to the first. Similarly, textures, such as "matte", "satin" or "silk screen", can be imparted to the surface of receiver 1 by applying a texturizing surface to web 42, thereby both fixing and texturizing the surface in one step. Again, for some materials and finishes, the lack of smoothness of a texturizing web prevents it from doing as good a job of embedding toner in layer 9 as a smooth hard ferrotyping web. For such materials it is best to embed at station 4 and texturize at station 5 in a separate step.

Figure 4:
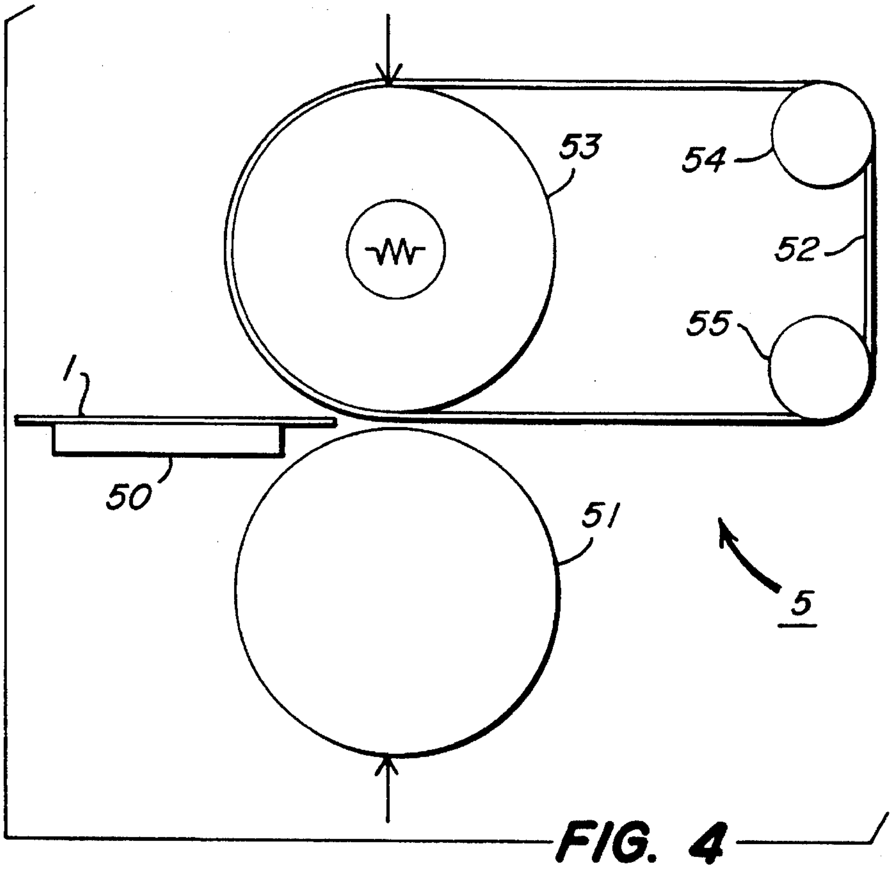
FIG. 4 is a side section of an embodiment of a texturizing apparatus incorporated in the apparatus of FIG. 1.

According to FIG. 4, texturizing station 5 can be constructed substantially like fixing station 4. As shown in FIG. 4, a ferrotyping web 52, in the form of a belt, is trained about a heated roller 53 and unheated rollers 54 and 55. Heated roller 53 forms a nip with an unheated roller 51. Receiving sheet 1 is fed across a preheating device 50 and into the nip between ferrotyping web 52 and roller 51 which are also pressed together with pressure of 100 psi or greater. Heated roller 53 and preheating device 50 raise the temperature of the thermoplastic layer on receiving sheet 1 above its glass transition temperature. According to one embodiment of the FIG. 4 structure, ferrotyping web 52 has a texturizing surface which imparts a texture to the image and the thermoplastic layer. Ferrotyping web 52 and thermoplastic layer 9 are allowed to cool as they move together to the right, as shown in FIG. 4, until they are separated at separation roller 55 as the ferrotyping web 52 makes an abrupt turn. Utilization of texturizing station 5 in addition to fixing station 4 not only adds a quality texture, for example, a satin or silkscreen finish, but with some hard to fix materials it also improves the permanence of the gloss or texture of the image surface.

Although excellent results are obtained with the apparatus just described with respect to FIG. 4, an alternative to that approach has some remarkable advantages. We have found that ferrotyping web 52 can be maintained with its original smooth and hard (glossy, nontexturizing) finish and a texturizing surface applied to roller 51 which, in this process, will impart texture to the thermoplastic surface on receiving sheet 1 through both the paper support and layer 8 without substantially embossing the paper or layer 8 itself. Roller 51 should be a hard metal roller, for example, chrome covered aluminum.

Figure 5:
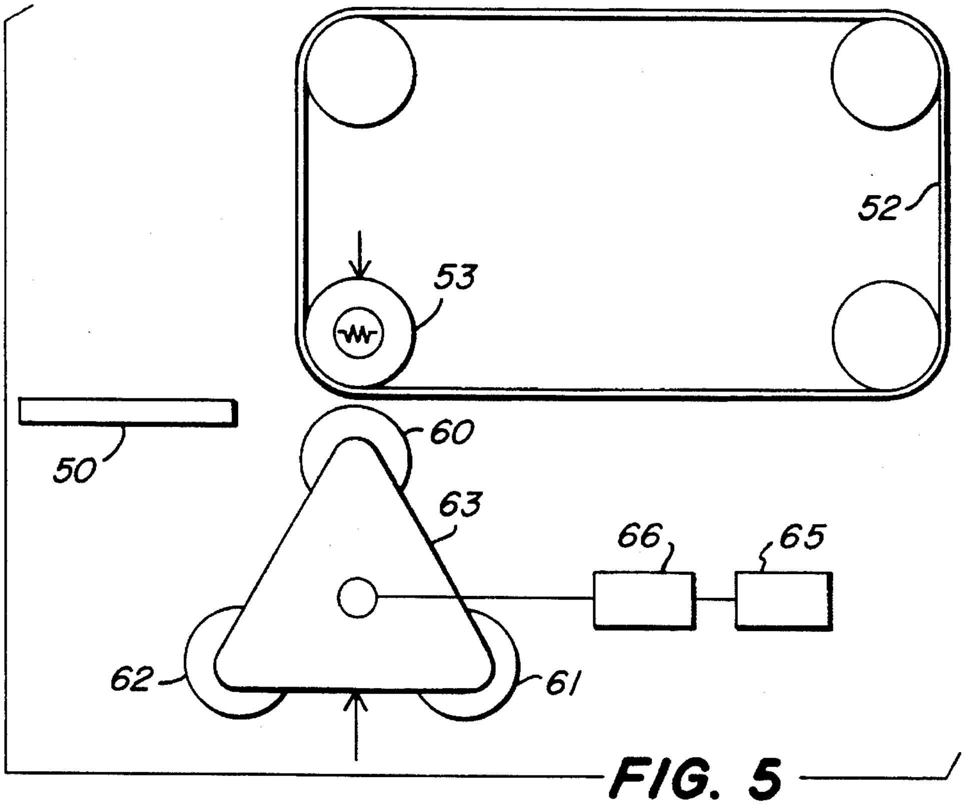
FIG. 5 is a side section of another embodiment of a texturizing apparatus.

This approach has many advantages over applying the texturizing surface to web 52 itself. One of those advantages is illustrated in FIG. 5 where roller 51 is replaced by three texturizing rollers 60, 61 and 62, which are carried on a turret mechanism 63. Turret mechanism 63 is rotatable to position any of texturizing rollers 60, 61 or 62 in operative position with respect to receiving sheet 1 and heated roller 53. Thus, an operator utilizing a suitable logic and control unit 65 can actuate a motor 66 which rotates turret 63 to position one of rollers 60, 61 and 62 in operative position according to which texture the operator wishes.

A second advantage of applying the texture using a texturizing surface that contacts the opposite or rear side of the support rather than the surface to be texturized, is that the structure, as originally described with respect to FIG. 4, necessitates a texturizing web 52 which had much more surface area to be formed into a texturizing surface. Switching to a different texture then involves changing web 52 rather than roller 51. Applying a particular texture to web 52 is more expensive per se, than to roller 60; the web is more expensive to have alternates of; and changing webs is also a more demanding task.

It is possible to texturize and fix with a texturizing web 42. But, in many applications fixing is locally not as good with a texturizing web rather than a smooth web. Thus, another advantage of applying the texture with a smooth surface contacting layer 9 and the texturizing surface contacting the opposite or back side, is that texturizing and fixing is more readily accomplished in a single step. That is, fixing station 4 is eliminated and the smooth ferrotyping web 52 embeds the toner in the heat softened thermoplastic while the texturizing surface of roller 51 imparts a texture to the thermoplastic.

If a texture is going to be applied from the rear as described, it is important that the rear of receiver 1 not be softened by the heat. If it is plane paper, that is no problem. However, if as described above, a polymeric or other layer 8 is used to prevent curl, that layer should have a higher melting or softening temperature than layer 9. The previously described example in which layer 9 is a thermoplastic with a glass transition temperature between 45° and 70° C. and layer 8 is a polyethylene or polypropylene layer having softening and melting points in excess of 115° C. provide a matte finish in layer 9 without permanently affecting layer 8 with reasonable control of temperature in the nip, for example, with the surface of web 52 heated to 105° C.

Further, with a textured roller 51 and a smooth gloss applying web 52, the textured surface on layer 9 has what might be called a "glossy-textured" surface. That is, it gives the texture desired but with a gloss to it. This is a result not believed possible with regular texturization from the front by texturizing with web 52. We believe the product produced by this method, for example, a "glossy-matte" finish, is a new product, per se.

FIGS. 3, 4 and 5 illustrate another aspect of ferrotyping webs 42 and 52. Such ferrotyping webs can be either endless webs, as illustrated in FIGS. 4 and 5, or can be a web having ends and using supply and takeup rolls, as shown in FIG. 3. Either approach is usable in either stations 4 or 5. The webs are reusable, although in some applications, cleaning, on line or off line, may be desirable.

Figure 6:
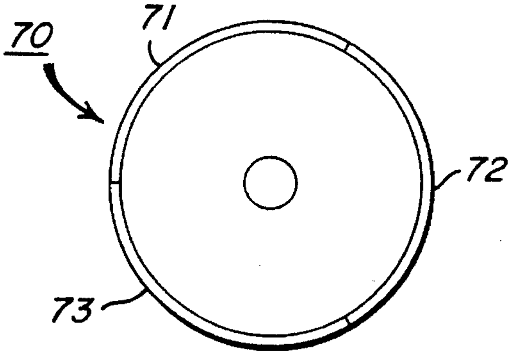
FIG. 6 is an end view of a texturizing backup roller usable in the texturizing apparatus shown in FIG. 4.
Figure 7:
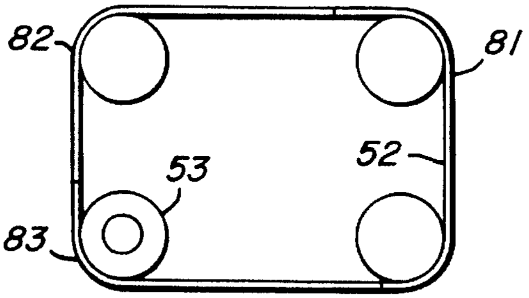
FIG. 7 is a side view of an endless web texturizing component usable as an alternative to the embodiment shown in FIG. 4 or FIG. 5.
Figure 8:
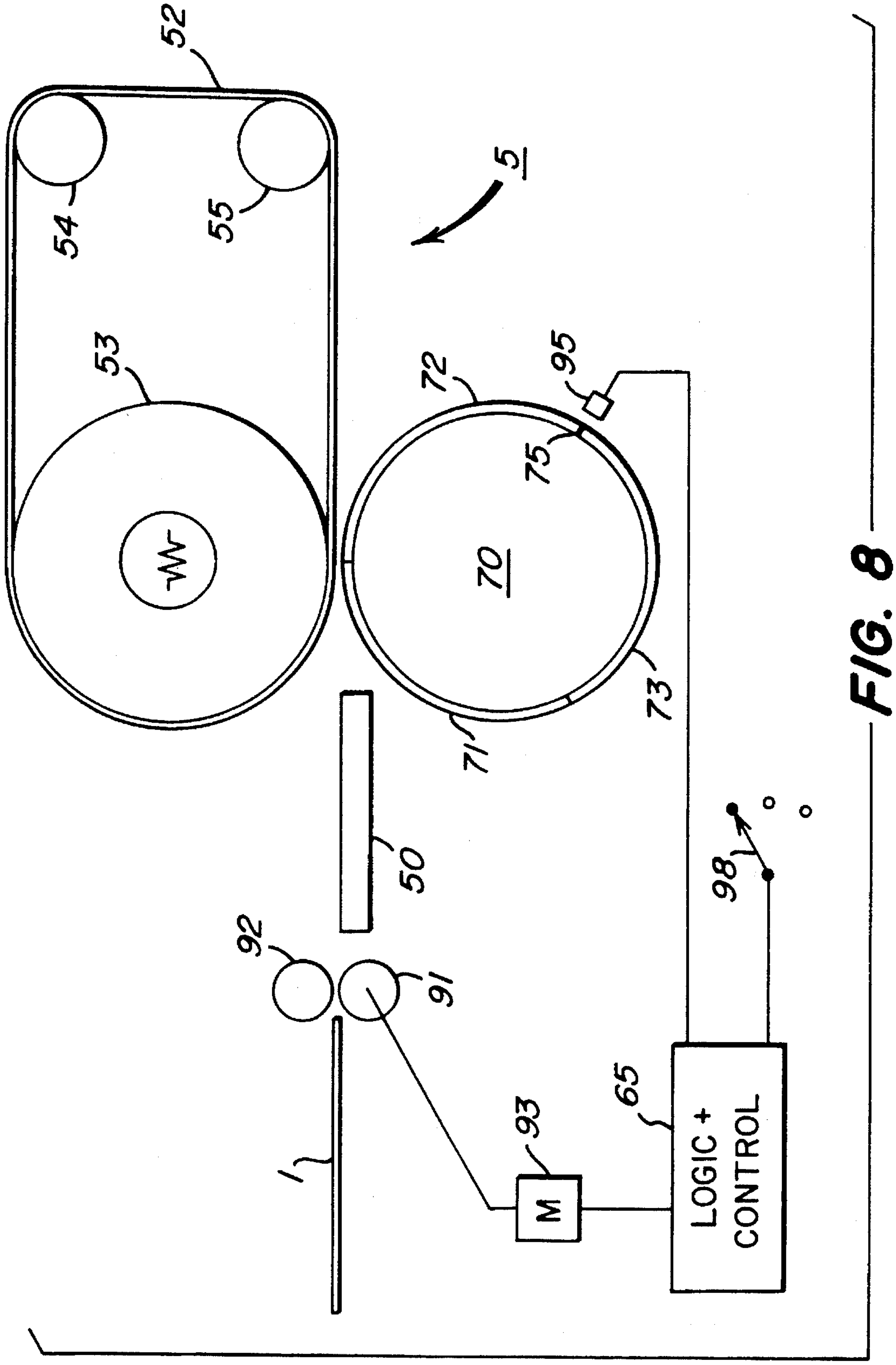
FIG. 8 is a side view of another embodiment of a texturizing apparatus particularly illustrating its timing mechanism.

FIGS. 6, 7 and 8 illustrate a texturizing approach that is usable with either a front side or back side approach to texturizing. According to FIG. 6 a single roller 70 is substituted either for the roller 51 in FIG. 4 or the turret 63 in FIG. 5. Roller 70 has an endless outer surface made up of three separate texturizing surfaces 71, 72 and 73. For example, surface 71 can be smooth to impart a glossy finish, surfaces 72 and 73 can be patterned to form satin and silkscreen finishes, respectively. Roller 70 allows the operator to pick from these three different texturizing surfaces with only a single roller necessary. The length around the periphery of each texturizing surface is at least equal to the length in the intrack direction of each image to be texturized.

FIG. 7 illustrates the same concept but with three texturizing surfaces 81, 82 and 83 around an endless surface on ferrotyping web 52. Again, the length of each texturizing surface is equal to (or greater than) the length of each receiving sheet 1 to be texturized.

FIG. 8 illustrates the use of texturizing surfaces 71, 72 and 73 on texturizing backing roller 70. Texturizing surfaces 71, 72 and 73 are periodically rotated by the drive on texturizing station 5 (not shown), into operative positions for receipt of receiving sheet 1. A pair of rollers 91 and 92 are driven by a separate motor 93 to feed receiving sheet 1 into the nip between ferrotyping web 52 and roller 70. An optical sensor 95 senses a mark 75 on roller 71 indicating the exact intrack position of the roller and, therefore, the location of the three texturizing surfaces 71, 72 and 73 once each revolution and feeds a signal indicative of that mark passing sensor 95 to logic and control 65. By suitable timing means, for example, an encoder on roller 70 or additional marks on roller 70, logic and control 65 signals motor 93 to drive rollers 91 and 92 to feed receiving sheet 1 into the nip between belt 52 and roller 70 in proper timed relation with texturizing surfaces 71, 72 and 73.

Rollers 91 and 92 are typical of feed mechanisms presently used in copiers to feed receiving sheets into appropriate registration with images at transfer stations and are capable of correctly positioning an image and receiving sheet in response to a signal from a detector such as optical detector 95. Picking the desired texture for the receiving sheet 1 is accomplished by the operator choosing between textures A, B and C at a switch 98, which choice is fed into logic and control 65 which, in cooperation with the signals from sensor 95 and the encoder, delays the feeding of sheet 1 until the appropriate texture approaches the nip between roller 70 and web 52.

If texturizing station 5 operates three times as fast as sheets are received to be texturized, then the texturizing device can operate at a constant speed and still keep up with the rest of the apparatus. Because a multicolor image is generally a combination of three or more separate images which must be combined at transfer station 3, this will generally be the case. However, if the texturizing process is not fast enough to keep up with the apparatus when operated at a constant speed and utilizing only one-third of the roller 70's surface, the motor 99 driving station 5 can be made a variable speed motor which accelerates as the receiving sheet 1 separates from web 52 and slows down again as the next receiving sheet is received in the nip between web 52 and roller 70.

The general scheme shown in FIG. 8 may also be used when web 52 is segmented as shown in FIG. 7.

The structure shown in FIG. 1 is shown with cut receiving sheets 1. However, it may also operate with a continuous sheet that is severed into cut sheets after the fixing and texturizing stations. Separate cut sheets are generally preferred for certain types of transfer, as mentioned above, but a continuous sheet has many advantages in handling through the finishing stations.

The invention has been described in detail with particular reference to a preferred embodiment thereof, but it will be understood that variations and modifications can be effected within the spirit and scope of the invention as described hereinabove and as defined in the appended claims.

We claim:

1. A method which comprises transferring at least one toner image to a thermoplastic layer having a glass transition temperature between 45° and 70° C. of a support which support includes a curl preventing layer having a melting point above 115° C. opposite said thermoplastic layer, said method including the step of raising the temperature of said thermoplastic layer to its glass transition temperature while said curl preventing layer is in contact with a heated transfer member, said curl preventing layer having a melting point sufficiently high to prevent offset of said curl preventing layer on said heated transfer member.

2. A method comprising:

forming a dry unfixed toner image partially embedded in a first surface of a receiving sheet, said receiving sheet having a support, a thermoplastic layer defining said first surface and a curl preventing layer on the opposite side of said support from said thermoplastic layer, said thermoplastic layer having a glass transition temperature between 45° and 70° C., and said curl preventing layer being of a material sufficiently similar to said thermoplastic layer to prevent curl of said receiving sheet when subjected to changes in temperature and humidity but having a melting temperature above 115° C., and heating said thermoplastic layer above its glass transition temperature without heating the curl preventing layer above its melting temperature while applying pressure to said thermoplastic layer and toner said pressure being applied by a pressure applying means which includes a pressure member which contacts said curl preventing layer, to further embed said toner in said layer without causing said curl preventing layer to offset onto said pressure member.

3. The method according to claim 2 wherein said pressure member is a roller with a hard dry metal surface.

4. The method according to claim 2 wherein said curl preventing layer is polypropylene.

5. The method according to claim 2 wherein said curl preventing layer is polyethylene.

* * * * *